United States Patent [19]

Johnson

[11] Patent Number: 4,970,883
[45] Date of Patent: Nov. 20, 1990

[54] LOCK ASSEMBLY WITH FLEXIBLE SHACKLE

[76] Inventor: Curt L. Johnson, 29856 Park Village Dr., Evergreen, Colo. 80439

[21] Appl. No.: 467,124

[22] Filed: Jan. 18, 1990

[51] Int. Cl.⁵ .............................................. E05B 37/02
[52] U.S. Cl. ........................................... 70/30; 70/58; 70/233; 70/386
[58] Field of Search .................... 70/30, 371, 49, 386, 70/233, 58, 33

[56] References Cited

U.S. PATENT DOCUMENTS

| | | | |
|---|---|---|---|
| 200,990 | 3/1878 | Deraismes | 70/49 |
| 1,240,146 | 9/1917 | Jackson | 70/30 |
| 3,297,333 | 1/1967 | Schwedt et al. | |
| 3,335,585 | 8/1967 | Stratton | |
| 3,354,675 | 11/1967 | Quigg | |
| 3,653,236 | 4/1972 | Kerr | 70/386X |
| 3,659,444 | 5/1972 | Wellekens | 70/386 |
| 3,687,472 | 8/1972 | Struble, Jr. | |
| 3,765,196 | 10/1973 | Balicki | 70/49 |
| 3,899,904 | 8/1975 | Brimhall, II | 70/58 |
| 4,024,741 | 5/1977 | Arblaster | 70/233 |
| 4,267,715 | 5/1981 | Aylesworth | 70/58 |
| 4,597,273 | 7/1986 | Reichenberger | 70/30 |
| 4,610,152 | 9/1986 | Düringer | 70/30 |
| 4,896,517 | 1/1990 | Ling | 70/30 X |

FOREIGN PATENT DOCUMENTS 227994   1/1925   United Kingdom ................... 70/30

*Primary Examiner*—Lloyd A. Gall
*Attorney, Agent, or Firm*—Kyle W. Rost

[57] ABSTRACT

A cylindrical combination lock body is associated with a flexible shackle, both ends of which are connected to a single end of the lock body so that the body and shackle are fitted within an approximately constant diameter. A cylindrical sleeve is sized to telescope over the shackle and receive the lock body. The sleeve has an annular groove on its interior face, which is positioned to mate with one or more detent balls in the cylindrical wall of the lock body. A plunger mechanism in the lock body can release the detent balls to permit insertion or removal of the body from the sleeve, and the plunger also releases the shackle when the combination is properly selected. The sleeve may be mounted in any sort of storage tube and enables the entire lock assembly to be stored in a secure and concealed manner.

11 Claims, 1 Drawing Sheet

U.S. Patent    Nov. 20, 1990    4,970,883
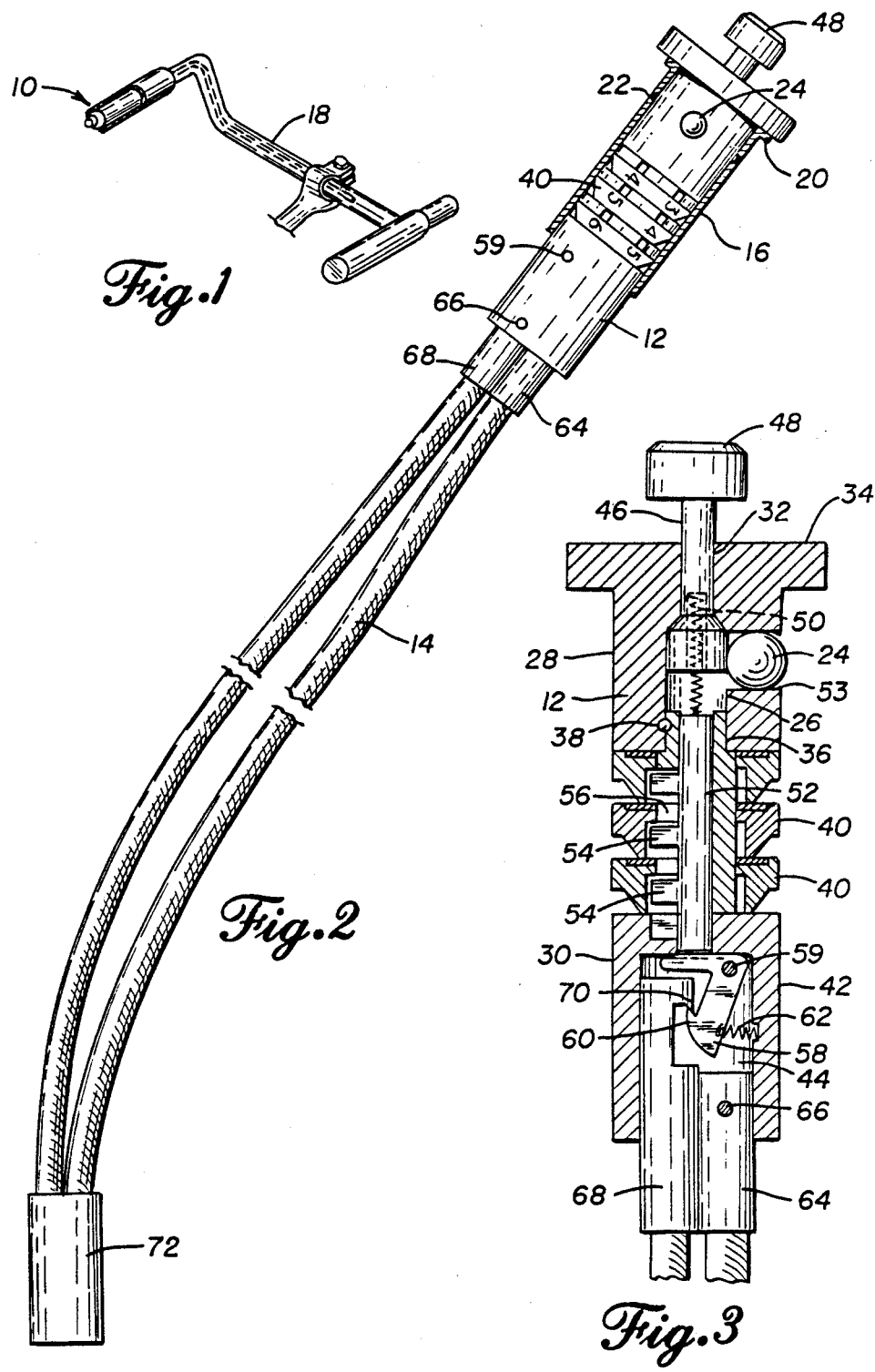

LOCK ASSEMBLY WITH FLEXIBLE SHACKLE

TECHNICAL FIELD

The invention generally relates to locks and more specifically to portable locks, especially to padlocks that are combination controlled. The invention also relates to portable padlocks that have a flexible shackle. Further, the invention relates to locks for cycles or other apparatus having a tubular element as a part thereof.

BACKGROUND ART

The prior art, as shown by U.S Pat. No. 3,354,675 to Quigg, has provided for a cable lock incorporated into a ski pole and having its ends permanently attached between separable pole portions. A coaxial combination lock selectively permits the handle portion of the pole to be removed so that the midsection of the cable can be wrapped around the poles and skis, after which the handle is reassembled and locked to the pole by the lock mechanism.

Similarly, U.S. Pat. No. 3,297,333 to Schwedt et al. provides for a ski pole having a wrist strap with one releasable end and one permanently attached end. An end mounted combination lock on the pole handle allows release and relocking of the releasable end, permitting the wrist strap to serve as a shackle to be wrapped about the remaining equipment.

Another ski pole mounted lock is disclosed in U.S. Pat. No. 4,267,715 to Aylesworth. A cable is permanently mounted by one end within the pole, while the opposite, free end can be freely extended and wrapped around ski equipment. The free end then is engaged between telescoping jaws on the pole, which are controlled by a lock carried coaxially on the pole.

U.S. Pat. No. 3,335,585 to Stratton discloses another ski pole lock in which the cable has an enlarged end that is retained within the pole. The second, free end carries a keeper and can be withdrawn through the pole's handle and engaged about ski equipment. Thereafter, the keeper on the second end is inserted into a lock carried in the handle and secured.

U.S. Pat. No. 3,899,904 to Brimhall, II, is similar to Stratton, with the additional feature that one ski pole may carry the captive end of the cable, while the second ski pole may carry a lock that receives the keeper on the free end of the cable when the cable is engaged about ski equipment.

U.S. Pat. No. 3,687,472 to Struble, Jr. discloses the use of a hollow ski pole for storage of a cable and cylindrical lock. A cap on the pole's handle covers the storage passage and can be opened to permit the lock and cable to be withdrawn. Otherwise, the cable lock is capable of forming a locked loop around the ski equipment when the lower end of the cable is inserted into the top of the lock. It is proposed that the lower end of the cable be elastically fastened to the bottom of the pole cavity by a retention bungee. Otherwise, it appears that this lock mechanism is not secured within the pole, but merely is housed inside.

From the state of the prior art, it can be seen that cable locks have been incorporated into equipment that stores some or all of the cable and lock, but with considerable structural alteration and compromise to the equipment. For this reason, concealed, stored cable locks are not readily available, unless a manufacturer choses to incorporate such a lock as part of the original equipment design.

Another problem is that if the coaxial lock in many of the above designs were to fail, the cable cannot be removed or used. In other designs, even if the cable can be reached, the ski pole or other host item no longer can function as a lock.

So as to eliminate the need for special adaptation, it would be desirable to create a cable lock that is storable in tubular equipment of many types, without degrading the structural integrity of the equipment.

Further, it would be desirable to create a cable lock that is positively, mechanically engaged within the tubular equipment while the cable is in storage, yet is released without having to manipulate the lock by dialing the combination or using a key.

Likewise, it would be desirable to have a portable lock that can be inserted into and mechanically engaged with a carrying tube without manipulation of the lock.

Still further, it would be desirable to create a storable, mechanically secured, portable lock that, upon failure of the locking mechanism, remains removeable from its secure storage position.

To achieve the foregoing and other objects and in accordance with the purpose of the present invention, as embodied and broadly described herein, the concealed, storable lock of this invention may comprise the following.

DISCLOSURE OF INVENTION

Against the described background, it is therefore a general object of the invention to provide an improved concealed, storable lock that is adaptable to a wide variety of tubular objects without compromising the structural integrity of such objects and without requiring special design of such objects. Thus, the invention allows the lock to be acquired independently of the object in which it will be stored.

Another object is to provide a concealed, storable lock that, while firmly, mechanically secured to a tubular carrier during storage, can be released and removed without manipulation of the lock mechanism.

A related object is to provide a storable lock assembly that can be inserted into a host tubular member for storage without requiring manipulation of the lock mechanism.

Still a further object is to create a mechanically secured, concealed lock assembly that can be removed from storage position regardless of whether the lock mechanism has failed.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a lock assembly includes a lock housing with a central, axial bore extending through it. The bore carries a plunger near a first end of the bore, partially extending from the bore, and this shaft is axially moveable with respect to the bore. A first resilient means such as a spring is associated with the plunger shaft for urging the plunger shaft to move in an axial direction with respect to the bore, especially to bias the shaft to move toward the first end of the bore.

A radial engaging means is moveable between extended and retracted position and is carried by the lock housing for generally radial movement with respect to the bore, for, in use, engaging an external, surrounding surface when in extended position and for disengaging from such surrounding surface when in retracted position. An activating means is operable for moving the radial engaging means from retracted position to extended position in response to axial movement of the plunger shaft in the bore. A lock pin is carried in the bore in a position axially juxtaposed to the plunger shaft and is axially moveable by the plunger shaft A lock means is carried by the lock housing and is selectively moveable between an unlocked position permitting axial movement of the lock pin in the bore and a locked position preventing axial movement of the lock pin in the bore. A shackle detent is carried in the housing in a position axially juxtaposed to the lock pin. Finally, a flexible shackle has a first end connected to the lock housing and has a second end releasably securable to the lock housing by the shackle detent.

The accompanying drawings, which are incorporated in and form a part of the specification illustrate preferred embodiments of the present invention, and together with the description, serve to explain the principles of the invention. In the drawings:

BRIEF DESCRIPTION OF THE DRAWINGS

FIG. 1 is an isometric view of the lock assembly stored in the handle bar of a bicycle, with the handle bar partially broken away and the cable portion of the shackle shown in phantom.

FIG. 2 is a plan view of the lock assembly, with a central portion of the flexible shackle omitted.

FIG. 3 is a cross-sectional view taken axially through the cylindrical lock portion of the lock assembly, showing the internal structure thereof.

BEST MODE FOR CARRYING OUT THE INVENTION

The lock assembly 10, as generally shown in FIG. 2, is formed of a lock housing 12 and a flexible cable or shackle 14. The housing 10 is preferred to be generally cylindrical so as to be adaptable to storage in a tubular member. The housing may have deviations from cylindrical shape without compromising its storage ability. The shackle attaches to the housing at one of the housing's ends, such as at a single axial end of a cylinder. Further, a generally cylindrical shell or sleeve 16 is sized and configured to receive the lock housing in axially telescoped relationship. The novelty of this arrangement is that the sleeve can be mounted in the end of any sort of tube, within which the lock assembly is to be stored. For example, FIG. 1 shows a bicycle handle bar 18 that holds the lock assembly and serves as the storage tube. Sleeve 16 can be adapted to fit closely within an end of a handle bar tube, such as by attachment with an adhesive. Thereafter, the lock housing can be engaged with the sleeve to store the lock assembly in an extremely secure manner. Therefore, the shell or sleeve should be sized or adapted at its outside surface to fit the storage tube, which function generally favors a cylindrical outer surface. The lock housing and the inside cavity of the shell can have shapes other than a cylinder, as it is necessary only that the lock housing be receivable within the shell.

Sleeve 16 is sized to receive the lock housing 12 with a coordinated fit. Thus, the inside diameter of a cylindrical sleeve and the outside diameter of a cylindrical housing 12 can be pre-sized for smooth engagement and with any desired amount of clearance. However, the outside diameter of the sleeve may be as large as desired, sized to be engaged in the selected storage tube. The body of the sleeve is preferred to have a radially outwardly extending flange 20 at its outer end, which serves as a stop when the sleeve is mounted in a tube. In addition, the flange covers small gaps between the sleeve and the storage tube and protects the end of the storage tube.

The sleeve is provided with a means for securing the lock housing. This means is preferred to be an inside annular groove 22 that is engaged by one or more generally radially displaceable detent balls 24 in the housing. This engagement mechanism is very secure and mechanically positive. However, other engagement means could be employed, such as mating magnets, spring fingers, or threads.

With reference to FIG. 3, the lock housing 12 contains mechanisms that both operate the engagement mechanism with the sleeve and operate the locking and unlocking of the shackle. These operating mechanisms are generally located within and about an axial bore 26 through the lock housing. The bore is non-uniform in cross-sectional shape in order to accommodate different mechanisms. The housing 12 itself may be formed to two portions, here termed the cap 28 and the base 30. The cap 28 may have a smaller diameter bore portion or narrow throat 32 near a shoulder 34 at its top or outer end, and a larger diameter bore extending downwardly to the bottom of the cap.

The top end of the base 30 is provided with a relatively smaller diameter cylindrical portion or nipple 36 that is engageable in the lower end of the cap bore to join the cap and base in final assembly. Suitable joining means may include one or more radial or transverse pins 38. The relatively narrow diameter of the nipple 36 may continue downwardly from the junction in order to provide a suitable carrying area for combination lock rings 40, described below. Below the lock ring area, the narrow nipple portion 36 widens to substantially the same diameter as the cap 28. Within this wider portion 42, the bore also is widened, for example, into a rectangular cavity 44 that is sized to receive both ends of the shackle 14.

The cap 28 carries a plunger shaft 46 in the bore, near a first or top end of the bore as shown in FIG. 3. The plunger shaft has both a narrower portion that fits within narrower bore throat 32 and a wider shaft portion that fits within wider bore portion 26 but is wider than throat 32. Thus, the plunger shaft is inserted into the cap from below and a free end of the plunger shaft extends out of the bore. A button 48 is attached to the free end of the plunger and provides a broad surface by which the plunger shaft can be pushed or depressed for axial movement with respect to the bore. With the button 48 installed, the plunger shaft is secured against removal or loss by the combination of the wider shaft portion and the button being on opposite sides of the narrow throat 32.

A first resilient means urges the plunger to move in an axial direction with respect to the bore. The preferred biasing urges the plunger shaft upwardly, in the relative axial direction of button 48. Thus, the wider bottom portion of the plunger is urged against the upper end of the wider portion of the bore. This first resilient means may be a spring 50, and the plunger shaft may partially house this spring in a cavity extending upwardly from the bottom of the plunger shaft. At its other end, the spring may act against a lock pin 52, described below, which is spaced apart from the plunger shaft at least when the shaft is in its upward position. The lock pin may have a centering boss on its end facing the plunger rod to maintain the spring in axial alignment.

A radial engaging means such as one or more, preferably three, detent balls 24 are moveable between extended and retracted generally radial position in the cap 28. The function of the sleeve engaging means is to engage the sleeve, or other available surrounding surface, when in extended position and to disengage from the sleeve or other surrounding surface when in retracted position. To achieve this result, the cap may have one or more generally radial passages 53 located approximately at the axial level where the wider portion of the plunger shaft rests against the top of the wider portion of the cap bore. A detent ball 24 is received in each radial passage and retained against loss in a conventional manner, such as by a partial closing of the outer end of the passage. The diameter of the ball 24 is wider than the length of the radial passage so that the wide, lower end of the plunger forces the ball to protrude outwardly from the passage. Thus, the plunger shaft serves as a cam, forcing the detent ball to be in an extended position, for engaging the annular groove 22 in the sleeve. However, when the plunger button 48 is depressed, a narrower portion of the plunger shaft is moved opposite the radial passageway and the detent ball is free to drop back to a retracted position. The lock housing then can be inserted into or withdrawn from the sleeve.

The described variation in the diameter of the plunger shaft serves as an activating means for moving the sleeve engaging means from retracted position to extended position in response to axial movement of the plunger shaft in the bore. So that this function can take place independently of movement to the lock pin 52, the plunger shaft and lock pin are spaced apart axially by a sufficient distance to permit the plunger to be depressed and to free the detent balls before it strikes the lock pin. Spring 50 aids this arrangement by biasing the plunger shaft away from the lock pin 52, typically maintaining an axial spacing approximately equal to the stroke of the plunger shaft. Thus, the plunger shaft can be depressed to release the detent balls regardless of whether the lock rings are holding the lock pin in locked or unlocked condition.

The lock pin 52 is a well known lock element found in cylindrical combination locks. This pin has a plurality of spaced apart locking teeth 54, typically three in number, aligned much like a key on a shaft. The teeth 54 extend radially through an axial slot 56 in the wall of the narrow, nipple portion 36 of the base. A like plurality of combination lock rings 40 are mounted on base portion 36. Each ring is marked with combination number markings around its circumference and can be rotated on the narrower portion of the cylindrical base. These rings also are conventional lock elements, each having a keyway at one of the number positions, such that when the keyways in all rings are aligned with the locking teeth, the lock pin is free to move axially in the bore. However, when any one of the rings is not so aligned, the lock pin is prevented from axial movement. Thus, the lock rings serve as a lock means that is selectively moveable between an unlocked position permitting axial movement of the lock pin in the bore and a locked position preventing axial movement of the lock pin in the bore. The lock pin is carried in the bore in a position axially juxtaposed to the plunger shaft, typically spaced from the plunger by the spring 50, and axially moveable under urging from the plunger shaft and spring when the lock rings are in unlocked position, leaving the pin free to move.

A further part of the locking mechanism is a moveable shackle detent 58, carried in the wider, base portion 42 of the lock housing in a position axially juxtaposed to the lock pin. The detent 58 may be an L-shaped member attached to the housing by a pivot pin 59. One arm of the detent is positioned approximately transversely to the axis of the bore, in a position axially juxtaposed to the lock pin. The second arm forms a hook or pawl 60 at its end, which is moveable between first detent position engageable with the withdrawable end of the shackle, and a second detent position non-engageable with the withdrawable end of the shackle. When the lock pin moves axially against the first arm, it pivots the detent and moves pawl 60 from first detent position to second detent position to release the shackle.

A second resilient means, for example spring 62, is located opposite the pawl 60 on the second arm. This spring resiliently urges the shackle detent into the first detent position, in which the pawl is positioned to engage the shackle whenever the shackle end may be inserted into the lock housing. The lock pin is in operative contact with the shackle detent, such that axial movement of the lock pin moves the shackle detent to second detent position against the force of spring 62. The plunger shaft initiates such axial movement through first spring 50. Thus, the spring 50 generally is stiffer than spring 62 and requires greater compressive force than the force necessary to move the shackle detent against spring 62. As a result, when the lock rings 40 are so positioned to allow the lock pin to slide in the bore, depressing the plunger button 48 will open the shackle. Of course, when the lock rings are in locked position, the lock pin cannot slide in the bore, and depressing button 48 merely compresses spring 50 and releases detent balls 24.

The flexible shackle 14 is preferred to be formed of steel cable with a vinyl covering to protect against marring. A first end of the cable is attached to a metal cap or ferrule 64, which is connected to the lock housing. For example, a pin 66 may fasten cap 64 to the housing and has the added advantage of permitting a small amount of pivotal motion. The cap 64 is partially received in the enlarged lower cavity 44 of the axial bore and is pinned through the housing walls. The second end of the cable also is attached to a metal cap or ferrule 68, which may be longer than cap 64. Near the free end of the cap 68 is formed a recess with a hooked lip 70, which can be engaged by the pawl 60 when the shackle is closed.

The midpoint of the cable may be folded, or the cable may be formed from two separate cable pieces joined in parallel at the midpoint. In either event, it is preferred that the midpoint of the cable carry a ferrule or metal cap 72. This cap is useful to keep the opposite halves of the cable close together for insertion into a storage tube. The cap also may serve as a guide for insertion.

The assembled lock housing 12 is approximately of a single, uniform diameter from the base through the cap, except at the wider shoulder 34. This diameter is preferred to be about 5/8 inch, which provides an ability to store the lock in many conventional objects having tubular storage areas In use, the lock assembly may require that the sleeve be installed into an available storage tube, although it is possible that the lock can be stored in a tube without the sleeve. For example, the tube itself may be properly sized to receive the lock housing, the tube may have a slightly inturned end capable of retaining the detent balls, or the tube may be reshaped to have an annular inside groove for retaining the detent balls.

In operation after the sleeve has been installed, the lock is stored by pushing the lock into the sleeve, cable end first. When the detent balls 24 reach the opening to the sleeve, it is necessary to push button 48 and thereby move the plunger shaft further into the axial bore, freeing the detent balls to retract. When shoulder 34 homes against sleeve flange 20, the detent balls are aligned with groove 22 and have space to move outwardly. The spring loaded plunger then will snap outward and lock the detent balls in the groove. The lock is secured by positive mechanical interaction of the detent balls and the groove and cannot be lost due to vibration. Removal of the lock from the sleeve requires only that the button 48 be depressed and that the lock be pulled free of the sleeve. Any failure of the lock mechanism will not prevent removal from the sleeve or require replacement of any part of the equipment in which the lock is stored.

The overall advantages of this lock assembly include an adaptability to many types of equipment having an available storage tube. It is considered an ideal lock for a bicycle, as it is stored in a secure position within the handle bars whenever the bicycle is in use. Yet, the lock can be withdrawn from its storage location in an instant and used to secure the bicycle to a fixed object. Other suitable types of tubular equipment include baby strollers, back packs, and ski poles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

I claim:

1. A lock assembly, comprising:
   a lock housing defining a bore extending axially therethrough;
   a plunger shaft carried in said bore near a first end of the bore and partially extending therefrom, said plunger shaft being axially moveable with respect to the bore;
   a first resilient means for urging said plunger shaft to move in an axial direction with respect to the bore;
   radial engaging means moveable between extended and retracted position, carried by said lock housing for generally radial movement with respect to said bore for, in use, engaging a surrounding surface when in extended position and for disengaging from a surrounding surface when in retracted position;
   activating means for moving said radial engaging means from retracted position to extended position in response to axial movement of the plunger shaft in the bore;
   a lock pin carried in the bore in a position axially juxtaposed to the plunger shaft;
   a lock means carried by the lock housing and selectively moveable between an unlocked position permitting axial movement of said lock pin in the bore and a locked position preventing axial movement of the lock pin in the bore;
   a shackle detent carried in the housing in a position axially juxtaposed to the lock pin; and
   a flexible shackle having a first end connected to the lock housing and a second end releasably securable to the lock housing by said shackle detent.

2. The lock assembly of claim 1, wherein:
   said first end of the shackle is received in said bore at the second axial bore end; and
   said second end of the shackle is receiveable in the bore at the second axial bore end, such that when both shackle ends are so received, they are contained within the diameter of the lock housing.

3. The lock assembly of claim 1, wherein said plunger shaft and lock pin are axially spaced apart, and said first resilient means is carried in said axial bore between the plunger shaft and the lock pin, whereby the plunger shaft can be axially depressed with respect to the bore against the first resilient means without the necessity of simultaneously moving the lock pin.

4. The lock assembly of claim 3, wherein said first resilient means comprises a spring.

5. The lock assembly of claim 3, wherein said shackle detent is moveable between a first detent position engageable with the second end of the shackle and a second detent position non-engageable with the second end of the shackle, and further comprising a second resilient means for resiliently urging said shackle detent into said first detent position.

6. The lock assembly of claim 5, wherein said shackle detent is in operative contact with said lock pin, such that the shackle detent is moveable from its first to its second detent positions in response to axial movement of the lock pin in the bore.

7. The lock assembly of claim 6, wherein said first resilient means requires greater compressive force than the force necessary to move the shackle detent to said second detent position, such that when the plunger shaft is depressed and when said lock means is in unlocked position, the lock pin will move the shackle detent to its second detent position.

8. The lock assembly of claim 1, further comprising a shell configured to receive said lock housing axially therein.

9. The lock assembly of claim 8, wherein said lock housing has a generally cylindrical side surface, and said bore extends axially with respect to said cylindrical side surface.

10. The lock assembly of claim 9, wherein near its first end said lock housing carries a shoulder of greater outside diameter than said generally cylindrical side surface of the lock housing.

11. The lock assembly of claim 10, wherein said shell comprises a generally cylindrical sleeve having an annular interior groove formed therein in an axial position approximately opposite said radial engaging means for receiving the radial engaging means in its extended position when the lock housing is inserted into the sleeve with said shoulder approximately against the sleeve.

* * * * *